Oct. 13, 1970  W. B. KECK  3,533,224
COTTON HARVESTER

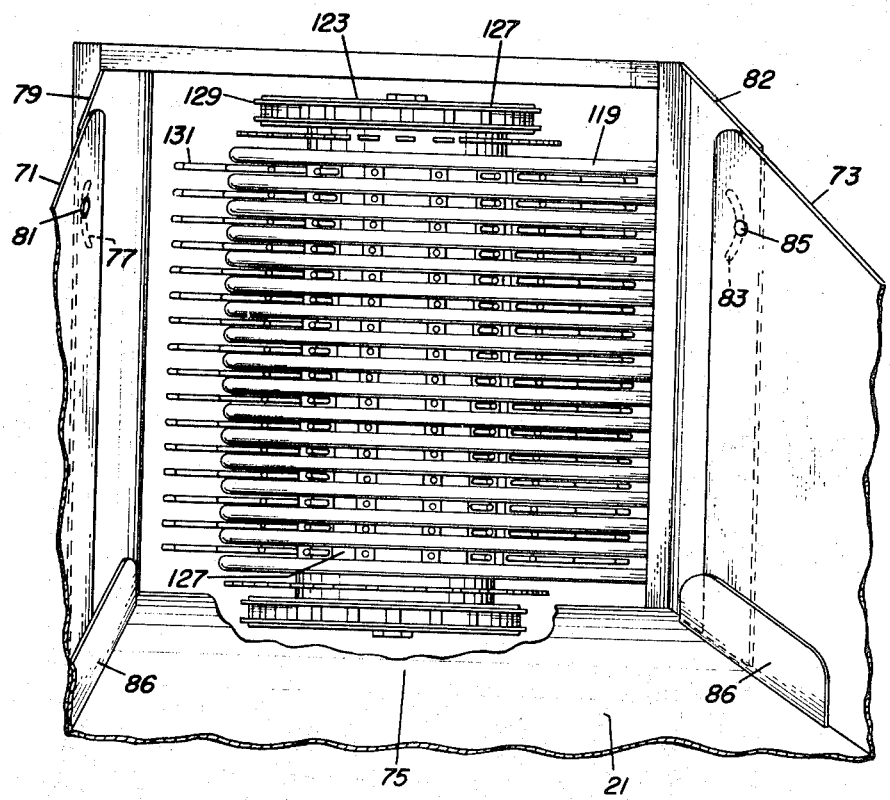
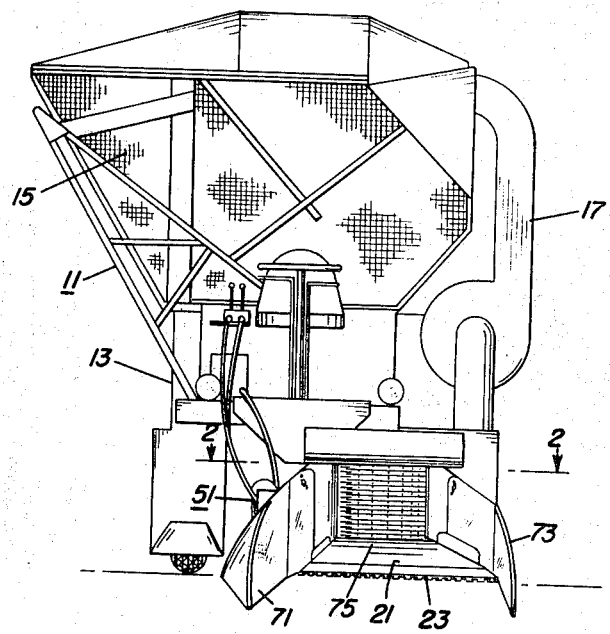

Filed May 23, 1966  3 Sheets-Sheet 3

INVENTOR.
WAYNE B. KECK

ATTORNEYS

United States Patent Office 3,533,224
Patented Oct. 13, 1970

3,533,224
COTTON HARVESTER
Wayne B. Keck, 175 W. Date St.,
Calipatria, Calif. 92233
Filed May 23, 1966, Ser. No. 552,011
Int. Cl. A01d 45/18
U.S. Cl. 56—28                            5 Claims

ABSTRACT OF THE DISCLOSURE

An improvement in a cotton harvester of the type in which the stalks of cotton are channeled mechanically rearwardly into the cotton boll picking mechanism, the improvement comprising a forwardly disposed sickle bar, walls extending forwardly of the sickle bar for directing standing stalks toward the bar, the walls also extending rearwardly, thereby providing a throat rearwardly of the bar for directing the severed stalk into the mechanism which channels the stalk toward the boll picking mechanism.

---

The present invention relates to an improvement in a cotton harvester, and more specifically to an improvement that adapts a cotton harvester for harvesting cotton from stalks that are growing in irregular or closely spaced rows.

The improvement of the present invention is for a cotton harvester of the type that comprises a propelled vehicle having mechanism for pickng cotton bolls from the cotton stalk. The mechanism to receive cotton stalks, with the bolls thereon, from the direction of forward movement of the vehicle.

The improvement in the harvester comprises the combination of an elongated sickle bar having two shearing bars disposed transversely of the direction of movement of the vehicle; means is provided for supporting the sickle bar from the vehicle and forwardly of the stalk receiving mechanism; and means is provided for reciprocating one of the shearing bars relative to the other. The sickle bar is adapted to cut the cotton stalk from the ground as it is moved into contact therewith.

Other features and the advantages of the present invention will be apparent from the following description, reference being had to the accompanying drawings wherein a preferred embodiment of the invention is illustrated.

In the drawings

FIG. 1 is a perspective front view of the cotton harvester of this invention;

FIG. 5 is a fragmentary front view of the front end of the cotton harvester shown in FIG. 2, the view being taken along the line 5—5 of FIG. 2.

Figure 2:
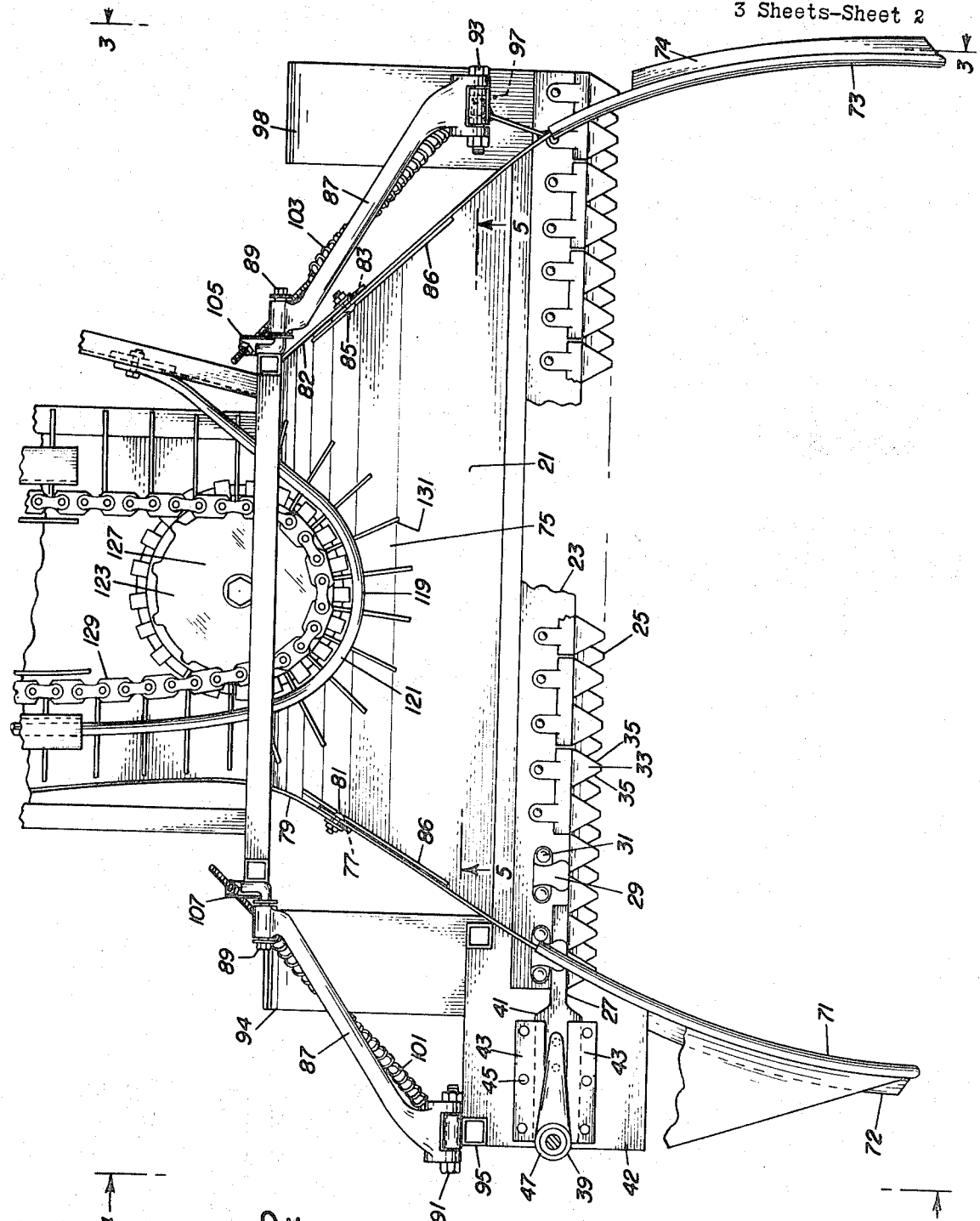
FIG. 2 is a fragmentary top view of the front end of the harvester shown in FIG. 1, which view is taken along the line 2—2 of FIG. 1.

Referring more in detail to the drawings and specifically to FIG. 1, the cotton harvester 11 includes a conventional propelled vehicle 13 of the self-propelled type. A cotton bin 15 is carried by the vehicle 13 and a chute 17 is provided for blowing cotton therethrough and into the bin. The cotton boll picking mechanism (not shown) is included in the lower portion harvester 11, which mechanism may be of any conventional type, such as that defined in Pat. No. 2,509,970 issued to V. E. Edmunds. The mechanism is adapted to receive the cotton stalk, with the cotton bolls thereon, from the direction of forward movement of the vehicle 13.

A support table or floor 21 is disposed below and extends forwardly of the stalk receiving mechanism. The table 21 is hingedly supported on its rearward end at 22 by the vehicle 13 and an elongated sickle bar 23 is carried on the forward end thereof.

The sickle bar 23 includes two shearing bars 25 and 27. One bar is movable relative to the other. The shearing bar 27 is carried by the bar 25 and is guided therein by a rib (not shown) on the under side of the bar 27, which rib extends into a groove (not shown) included in the bar 25. The bar 27 is maintained against the bar 25 by retainers 29, which retainers are riveted to the bar 25 by rivets 31. Each of the shearing bars 25 and 27 include a plurality of forwardly extending blades 33, each of which blades includes two forwardly extending shearing edges 35. The shearing edges 35, included in the bar 27, are adapted to shearingly co-operate with the shearing edges 35 in the blades 33 of the bar 25.

The drive end 39 of the bar 27 includes a slide plate 41 that is retained slidably between an extension 42 of the harvester 11 frame and retainers 43, which retainers are bolted to the frame extension by bolts 45. A boss 47 is affixed to the plate 41.

A drive mechanism 51 is provided for imparting slidable, oscillatory motion to the bar 27, thereby effecting the shearing action between the shearing edges 35 included in the bar 25 and bar 27. The drive mechanism 51 includes a horizontally extending shaft 52 that is rotatably journaled in the harvester frame at 53. The shaft 52 is driven by a hydraulic motor 54 which motor acts through a pulley 55 that drives a belt 56 that extends about a pulley 57 on the shaft 52. The hydraulic motor 54 is driven by hydraulic fluid that is introduced thereinto through a conduit 58 and passes therefrom through a conduit 59.

Figure 4:
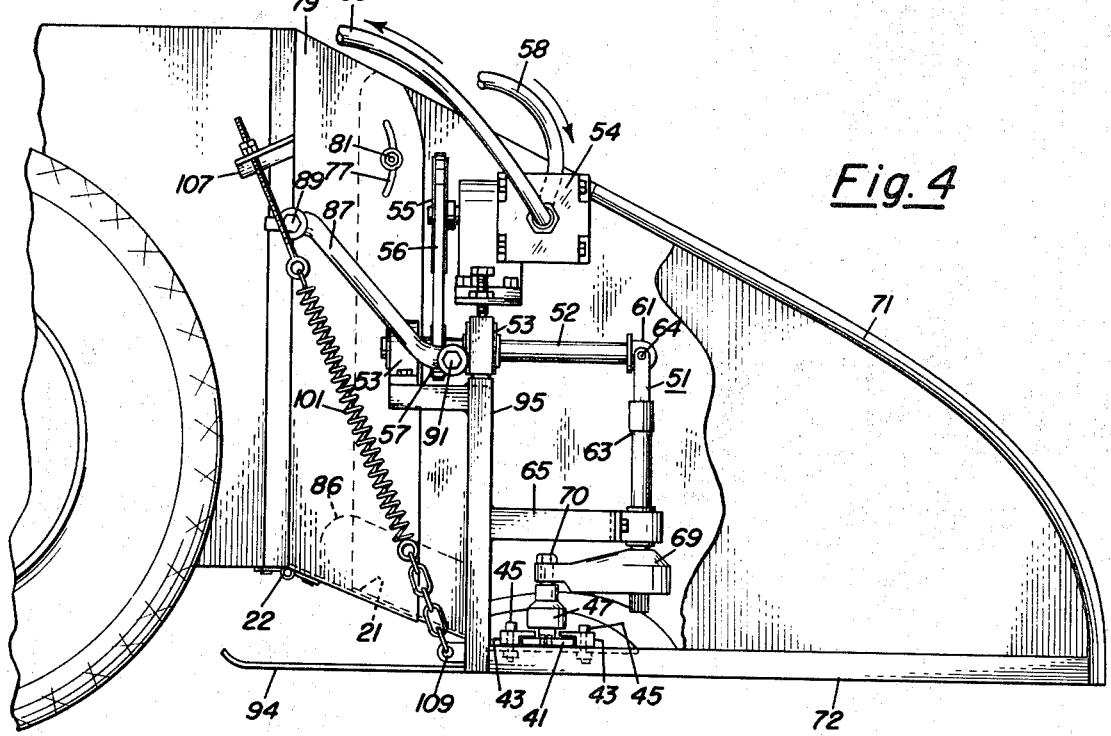
FIG. 4 is a fragmentary view of the right side of the front end of the harvester shown in FIG. 2, the view being taken along the line 4—4 of FIG. 2.

The rotational motion of the shaft 43 is converted to oscillatory motion by a conventional wobbler joint 61. The oscillating portion of the wobbler joint 61 is pivotally attached to a vertically extending shaft 63, by pins 64 (one of which is shown in FIG. 4).

The shaft 63 is suitably journaled through a vehicle frame extension 65. The lower end of the shaft 63 is telescopically splined into one end of a drive arm 69. The drive arm is carried on the movable blade 27 by a spindle 70 that is secured suitably in the boss 47. Thus, it will be apparent that when hydraulic fluid is introduced into the motor 54, the rotational movement of the shaft 52 will be converted to oscillatory movement by the joint 61 and such oscillatory movement will be transmitted through the shaft 63 to the drive arm 69, which arm will oscillate rotatably to impart oscillatory movement to the movable bar 27 through the spindle 70. It will be clear that the sickle bar 23 depending from the forward edge of the hingedly supported table 21 is free to move upwardly and downwardly with respect to the frame extension 65 since the shaft 63 extends telescopically into the arm 69.

The embodiment includes an assembly having vertically extending walls 71 and 73, from which the forward end of the table 21 and depending sickle bar 23 depend. The walls are spaced from each other and extend inwardly and rearwardly to form a throat 75. The walls 71 and 73 also preferably extend forwardly and outwardly beyond the sickle bar 23, thereby providing for funneling the standing cotton stalk into the sickle bar 23. Runners 72 and 74 are included on the forward end of the lower edges of the walls 71 and 73 respectively and said runners are adapted to slide along the ground and provide support for the forward end of the walls 71 and 72 and depending table 21.

Figure 3:
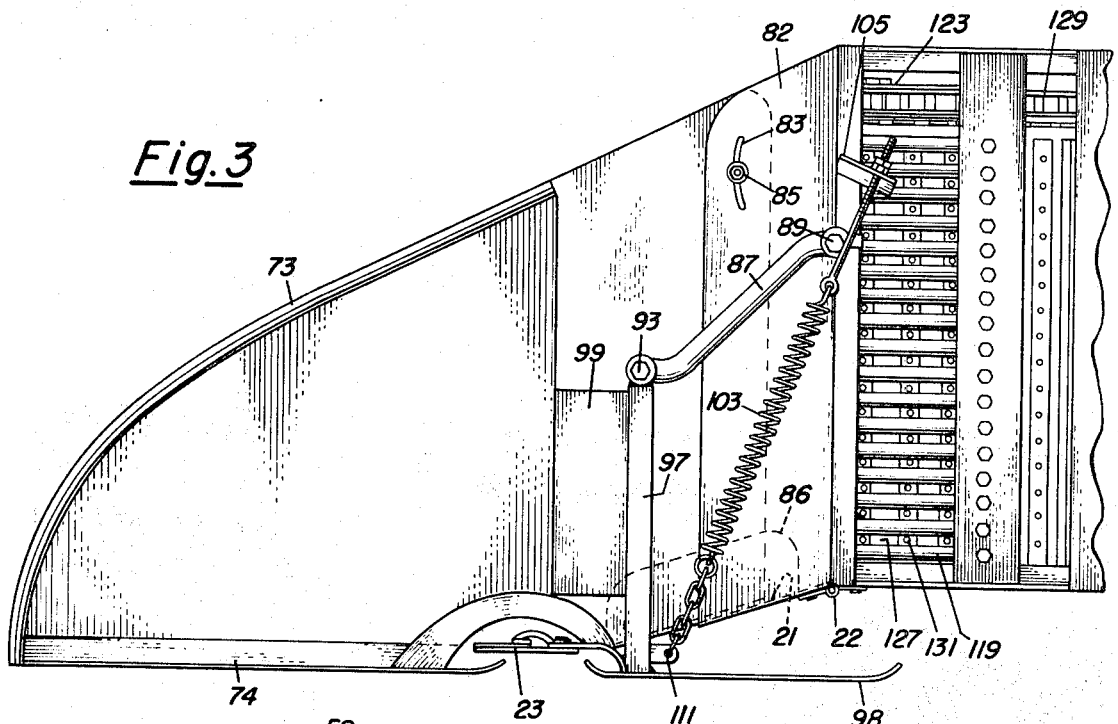
FIG. 3 is a fragmentary view of the left side of the front end of the harvester shown in FIG. 2, the view being taken along the line 3—3 of FIG. 2.

The walls 71 and 73 are connected to the harvester 11 in such a manner that they are free to move upwardly and downwardly with respect to the harvester and to carry the depending table 21 and sickle bar 23 upwardly and downwardly also. In the embodiment, this has been accomplished by including an elongated slot 77, as shown in FIG. 4, in a wall portion 79 extending from the vehicle 13. The wall 71 extends inwardly and rearwardly by the portion 79 and is slidably supported by a bolt 81 that extends therethrough and through the slot 77. The wall 73 is secured to the harvester 11 in a similar manner and is attached to a stationary wall 82, which wall also includes a slot 83, as shown in FIG. 3, and a bolt 85 is secured through the wall 73 and through the slot 83.

Plates 86 are affixed to the table 21, and extend over the joints formed by the wall and vehicle connections, thus providing for guiding the lower portion of the cotton stalk by the joints.

Arms 87 on the assembly are pivotally connected on one end to the harvester 11 by bolts 89 and are pivotally connected on their opposite ends by bolts 91 and 93, to the upper ends of braces 95 and 97, respectively. The brace 95 is fastened on its lower end to the table 21 and a runner 94 extends rearwardly from the table 21 immediately behind the brace. A runner 98 is welded to the lower end of brace 97 and a web 99 extends between the brace 97 and the wall 73.

Adjustable tension springs 101 and 103 are affixed on their upper ends to the vehicle 13 by plates 105 and 107, respectively, and on their lower end to the braces 95 and 97 at 109 and 111, respectively. It will be noted that the springs 101 and 103 are arranged in relationship to the arms 87, so that the tension in the springs tends to lift the walls 71 and 73 and depending table 21 thereby supporting a portion of their weight. Thus, when the runners 72 and 74 encounter uprises in the terrain over which the harvester 11 is passing, the walls 71 and 73 and depending table 21 and sickle bar 23 will be lifted without the runners 72 and 74 tending to gouge or dig into the uprise. After the runners 72, 74, 94 and 98 pass the encountered uprise, the walls 71 and 73 and depending table 21 and sickle bar 23 will be lowered to their normal position.

The embodiment also includes mechanism for urging the cotton stalk and included boll rearwardly in the throat 75 and that mechanism includes a plurality of horizontally extending and vertically spaced fingers 119. The fingers 119 are affixed on one end to the vehicle 11 on one side of the throat 75 and extend arcuately forwardly and inwardly in the throat and form a reverse bend 121 to extend rearwardly and substantially parallel to, and spaced from, the wall portion 79. Vertically extending reels (one of which is shown as 123) are disposed in the throat 75 and between the sickel bar 23 and picking mechanism. The reels are spaced longitudinally within the throat and the forward most reel 123 is disposed within the reverse bend 121. The reels include a plurality of vertically spaced wheels 127, each of which is adapted to carry a chain similar to chain 129. Some of the chains include horizontally extending tines 131 that are adapted to extend horizontally outwardly through the fingers 119. The rear reel (not shown) is rotated by a drive mechanism (not shown) such that the tines 131 are moved rearwardly along the wall portion 77. The tines thus encounter the cotton stalks and included bolls as the severed stalk tumbles rearwardly from the sickle bar 23 and over the table 21 and urges them transversely in front of the reverse bend 121 and rearwardly in the space between the wall portion 79 and the rearwardly extending portion of the fingers 119.

From the foregoing, it will be apparent that the cotton harvester 11 of the present invention is operated by actuating the boll picking mechanism and the sickle bar 23. The propelling vehicle 13 is then put into gear and as the vehicle moves forwardly and encounters cotton stalks, the stalks are funneled between the walls 71 and 73 and will be severed by the sickle bar 23. The stalk will then tumble rearwardly over the table 21 and will be encountered by the tines 131 and will be moved and guided rearwardly in the channel between the rearwardly extending wall 79 and the chains 129 into the picking mechanism. The bolls are picked from the stalk and deposited in the bin 15 and the severed stalk may be deposited on the ground.

In addition, the sickle bar 23, which depends from the forward edge of the table 21, and is maintained a constant distance from the ground, regardless of the regularity of the terrain over which the vehicle 13 is moving, since the runners 72, 74, 92 and 98 control that distance independent of the vehicle 13.

From the above, it will be apparent that the harvester 11 of this invention provides a convenient means for mechanically picking cotton stalks that are irregularly spaced or which are growing in closely spaced rows. It will also be noted that the picking mechanism need not be synchronized to the ground speed of the vehicle 13. Thus, the cotton may be planted in closely spaced rows by a conventional wheat or oat drill and this invention provides an efficient means for harvesting the matured cotton.

While the form of embodiment herein shown and described constitutes preferred form, it is to be understood that other forms may be adopted falling within the scope of the claims that follow.

I claim:

1. An improvement in a cotton harvester of the type that comprises, a propelled vehicle, mechanism for picking cotton bolls from cotton stalks, said mechanism including a channel adapted to receive the stalks, with the cotton bolls thereon, from the direction of forward movement of the vehicle and including mechanically movable elements for moving severed stalks rearwardly through the channel, the improvement comprising in combination:

(A) an elongated sickle bar including:
      (1) two shearing bars disposed horizontally and transversely of the direction of movement of the vehicle and adapted to cut the cotton stalk from the ground as the vehicle moves in a forwardly direction;
   (B) means for supporting the sickle bar by the vehicle and forwardly of the aforesaid mechanically movable elements;
   (C) means for reciprocating one of the shearing bars relative to the other;
   (D) vertically extending walls carried by the vehicle and substantiallly spanning the length of the sickle bar, said latter walls extending forwardly of the sickle bar for entrapping the standing stalks and extending rearwardly of the sickle bar and toward one another to form a throat which merges with the aforesaid channel.

2. An improvement as defined in claim 1, characterized to include:

(E) a floor spanning the vertically extending walls and extending rearwardly from the sickle bar to said space.

3. An improvement as defined in claim 1, characterized in that the sickle bar and the vertically extending walls form an assembly, and further characterized to include:

(E) means for pivotally connecting the assembly to the vehicle.

4. An improvement as defined in claim 2, characterized in that the sickle bar, the vertically extending wall and the floor form an assembly, and further characterized to include:

(F) means for pivotally connecting the assembly to the vehicle.

5. An improvement as defined in claim 3, characterized to include:

(F) means supporting a portion of the weight of the assembly.

References Cited

UNITED STATES PATENTS

| | | | |
|---|---|---|---|
| 2,139,927 | 12/1938 | Bane | 56—297 X |
| 2,509,970 | 5/1950 | Edmonds | 56—30 |
| 3,151,429 | 10/1964 | Dyrdahl | 56—23 |
| 3,298,162 | 1/1967 | Medd | 56—16 |

LUCIE H. LAUDENSLAGER, Primary Examiner

U.S. Cl. X.R.

56—11